(12) United States Patent
Kaplan

(10) Patent No.: US 6,619,170 B2
(45) Date of Patent: Sep. 16, 2003

(54) SLICER

(76) Inventor: Robert Elliot Kaplan, Mishol Uzrad 7/4, Ramot B, Jerusalem (IL), 97277

( * ) Notice: Subject to any disclaimer, the term of this patent is extended or adjusted under 35 U.S.C. 154(b) by 0 days.

(21) Appl. No.: 10/226,492

(22) Filed: Aug. 21, 2002

(65) Prior Publication Data

US 2003/0051590 A1 Mar. 20, 2003

(30) Foreign Application Priority Data

Aug. 23, 2001 (IL) ................................................ 145062

(51) Int. Cl.$^7$ ............................................ B26D 1/147
(52) U.S. Cl. .......................... 83/167; 83/155; 83/165; 83/394; 83/395; 83/932; 83/733
(58) Field of Search .......................... 83/167, 733, 932, 83/155, 395, 394, 165

(56) References Cited

U.S. PATENT DOCUMENTS

| | | | |
|---|---|---|---|
| 3,530,915 A | * | 9/1970 | Sadanobu Moriuchi ........ 83/92 |
| 3,867,858 A | * | 2/1975 | Tsuchiya et al. ............. 83/113 |
| 3,972,256 A | * | 8/1976 | Ross ............................. 83/155 |
| 4,249,445 A | | 2/1981 | Browning |
| 4,368,657 A | * | 1/1983 | Pellaton ..................... 83/356.3 |
| 4,776,252 A | | 10/1988 | Herlitzius |
| 4,813,317 A | * | 3/1989 | Urschel et al. ............ 83/356.3 |
| 4,852,441 A | * | 8/1989 | Anders et al. ................ 83/155 |
| 4,960,025 A | * | 10/1990 | Fitch ........................... 83/703 |
| 5,343,790 A | * | 9/1994 | Kuhrt .......................... 83/395 |
| 5,732,610 A | | 3/1998 | Halladay et al. |
| 5,881,621 A | | 3/1999 | Dennis |
| 5,903,982 A | | 5/1999 | Gibson |
| 5,927,701 A | | 7/1999 | Chapman |
| 6,318,224 B1 | * | 11/2001 | Hoyland ......................... 83/23 |

* cited by examiner

Primary Examiner—Allan N. Shoap
Assistant Examiner—Phong Nguyen

(57) ABSTRACT

A machine for slicing a bakery product, including a supported table surface having an aperture for the passage therethrough of sliced products; a pair of spaced-apart riser blocks projecting above said table surface; at least one power-driven cutting device disposed adjacent to said riser blocks, the cutting device having a horizontal blade extending above said table surface at a distance substantially corresponding to the slice thickness required, and a power-driven turntable, revolvable on a vertical axis and spaced above said cutting device, the turntable rigidly supporting at least one open-ended feed hopper adapted to contain a stack of bakery product items, the lowest item in said stack resting on the table surface and being pushed by the hopper into contact with said cutting device to produce a slice.

8 Claims, 4 Drawing Sheets

SLICER

FIELD OF THE INVENTION

The present invention relates to the slicing of food products, and more particularly, concerns a slicing machine particularly useful for bakeries, for cutting buns and bagels into multiple thin slices. The slicing machine of the invention is provided with a novel device to ensure that the last part of the bagel to leave the feed hopper is cut.

BACKGROUND OF THE INVENTION

Bagels are torus-shaped bread products made of a relatively dense, hard dough, frequently topped with poppy or sesame seed. Bagels are in high demand, and special outlets have been established which sell bagels as their primary product.

Bagels may be divided into two by a complete or partial horizontal cut, for toasting or in order to insert therein some other foodstuff such as cheese, vegetables, butter, fish, etc. Such cutting can cause injury when done by hand with an unguided sharp knife, and consequently has resulted in the development of various bagel slicing devices which are much safer and easier to use. Most such devices are hand-powered, but electrically powered bagel slicers are also known.

Many U.S. patents describe bagel cutting devices intended primarily for home use, among them U.S. Pat. Nos. 4,249,445; 5,732,610; 5,881,621; 5,903,982 and 5,927,701. An automatic machine for cutting bagels in half is described in U.S. Pat. No. 4,776,252. The devices described in said patents are not slicing machines, however, in the sense that they only cut the bagel into two, or partially cut the bagel to produce a butterfly cut.

Bakeries producing bagels cannot know exactly how many bagels will be required during the course of any given day, and are often faced with a substantial surplus at the end of a working day. Such bagels, even if frozen or refrigerated, cannot be sold as a fresh product on the following morning. A solution to this problem is to slice the left-over bagels into multiple thin slices, typically 4 mm thick. The slices are then baked and packaged and sold as a separate product, referred to as "bagel chips." Clearly, such a slicing operation can only be done economically by an automatic machine built for this purpose.

The machines commonly seen in butcher shops for slicing sausages and in delicatessens for slicing cheese have been used to slice bagels for the preparation of bagel chips. Such a machine has a rotary cutting blade and a reciprocating platform for supporting the food item to be sliced. An operator is needed to hold and advance the food item into the blade. Output is low, and there is the ever-present danger of operator injury.

Bagel chips without a central hole have been produced by preparing rod-shaped pieces of bagel-type dough which are baked and then sliced in a food processor. A vertical feed tube guides the rod-shaped bread product into a rotating disk equipped with a slicer, of the type commonly used for making potato chips. Aside from requiring an operator and failing to provide a solution for utilizing left-over bagels, this method does not provide consumers with the expected, characteristic washer-like bagel shape; the slices produced by this method are disk-like.

A commercially available machine which effects multiple cuts is marketed by ProBake, Inc., 2057 East Aurora Road, Twinsburg, Ohio, U.S.A. This machine has multiple reciprocating blades which inhibit changing the thickness of the slices, and the bagels are fed through the machine by a gravity chute. The claimed input is 60 bagels per minute, the equivalent of about 600 slices, and the machine is quite costly.

A disadvantage of known machinery for bagel slicing is that the last portion of a bagel being cut, which is typically of a smaller diameter than the major portion of the bagel, goes out of control in the feed hopper and enters the collector bin without being cut to the required thickness. The problem arises because the remaining piece of the bagel is thicker than required, yet is thinner than the distance between the bottom of the feed hopper and the surface of the table. The problem cannot be solved by lowering the feed hopper to be closer to the table, because the lower face of the feed hopper must pass over the cutting device.

DISCLOSURE OF THE INVENTION

It is therefore one of the objects of the present invention to obviate the disadvantages of prior art bagel-slicing machines and to fill the gap between manual cutting and high speed, expensive machines, by providing a machine which operates in the range of between 80 to 200 slices per minute.

It is a further object of the present invention to provide means for controlling the last portion of a bagel or bun and to ensure that this portion too is cut to the required thickness.

The present invention achieves the above objects by providing a machine for slicing a bakery product, comprising a supported table surface having an aperture for the passage therethrough of sliced products; a pair of spaced-apart riser blocks projecting above said table surface; at least one power-driven cutting device disposed adjacent to said riser blocks, the cutting device having a horizontal blade extending above said table surface at a distance substantially corresponding to the slice thickness required, and a power-driven turntable, revolvable on a vertical axis and spaced above said cutting device, the turntable rigidly supporting at least one open-ended feed hopper adapted to contain a stack of bakery product items, the lowest item in said stack resting on the table surface and being pushed by the hopper into contact with said cutting device to produce a slice.

In a preferred embodiment of the present invention, there is provided a slicing machine wherein the cutting device comprises a rotary disk blade.

In a most preferred embodiment of the present invention there is provided a slicing machine provided with four feed hoppers and two cutting devices.

Still further embodiments of the invention will be described below.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1a is a sectioned, front elevational view of a preferred embodiment of a slicing machine according to the present invention;

FIG. 1b is a perspective view of the machine table of the embodiment of FIG. 1, in which the turntable is removed;

FIG. 1c is a perspective view of the follower-pusher of the embodiment of FIG. 1;

FIG. 2 is a sectioned, front elevational view of a second embodiment of the invention, showing a slicing machine provided with a removable collector bin;

FIG. 3 is a plan view of an embodiment of an adjustable hopper;

FIG. 4 is a diagrammatic view of a drive system using a single motor, and

FIG. 5 is an outline plan view of a further embodiment, providing multiple feed hoppers and cutting devices.

DETAILED DESCRIPTION OF THE PREFERRED EMBODIMENTS

Figure 1A:
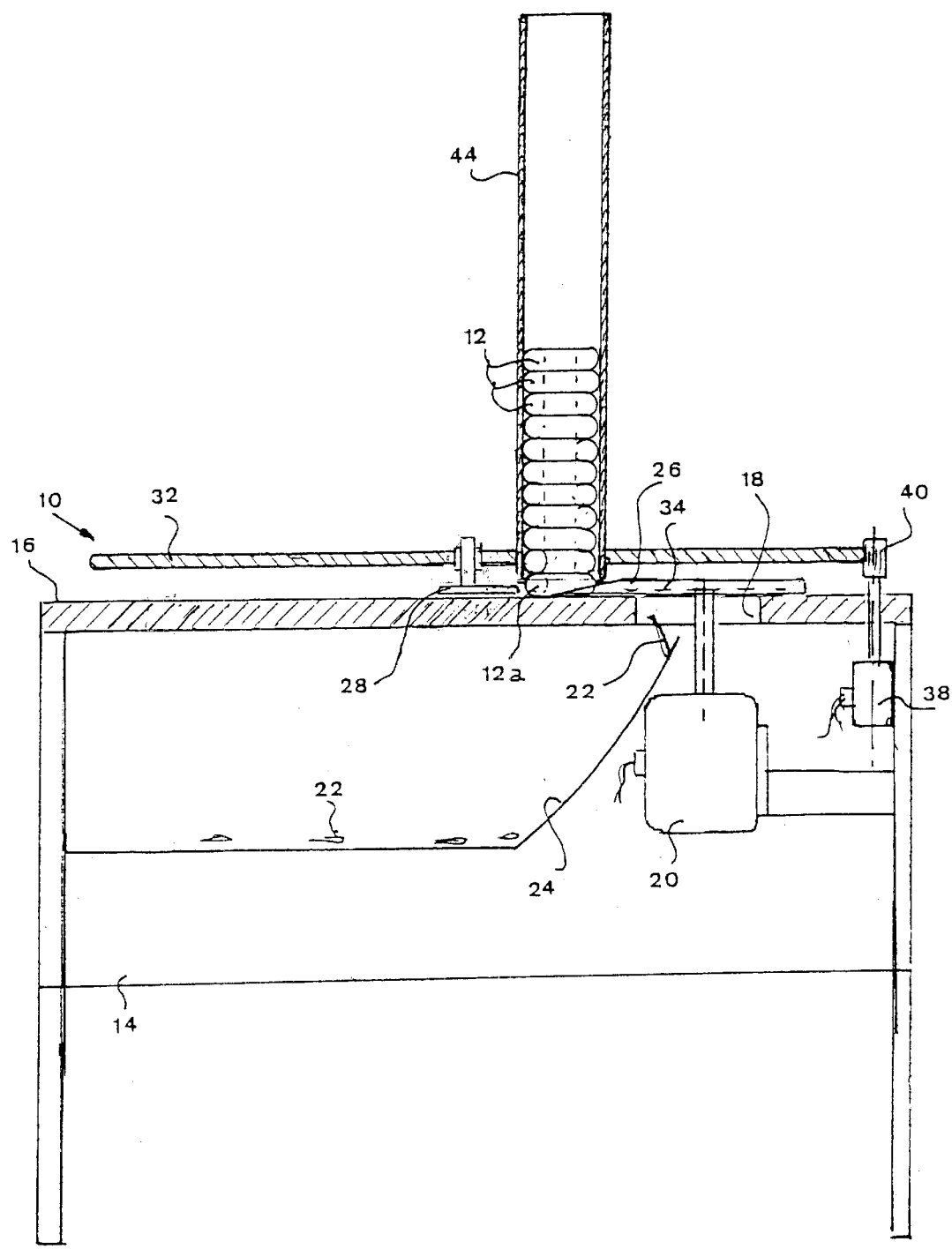

FIG. 1a illustrates a machine 10 for slicing bakery products. In the embodiment shown, the bakery product is a bagel 12. A machine housing 14 is provided with a smooth table surface 16 near its upper extremity. The table 16 has an aperture 18, allowing the cutting device 20, to be described further below, to project therethrough and to allow the passage therethrough of product slices 22 cut by the machine 10. A deflector chute 24 ensures that the cut slices 22 are kept clear of the machine mechanism.

Figure 1B:
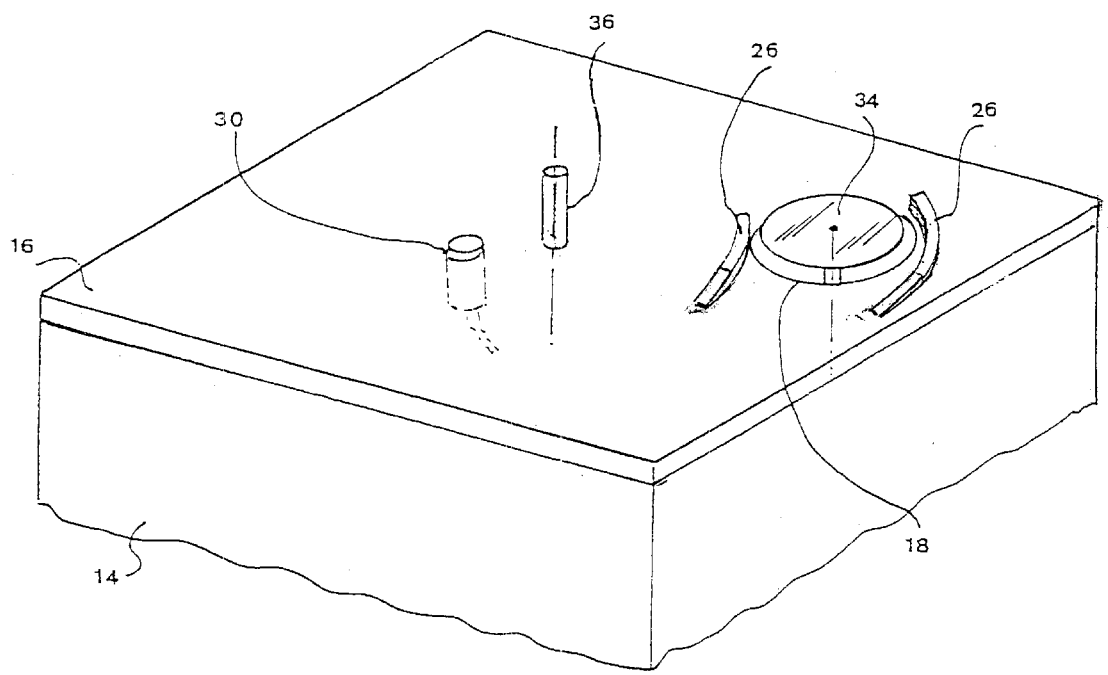

Seen more clearly in FIG. 1b are a pair of spaced-apart, wedge-like riser blocks 26, extending above the upper surface of table 16. The blocks 26 serve to lift the follower-pusher 28, as will be described below. FIG. 1b also depicts a proximity switch 30 which, for reasons of safety, is arranged to cut off the machine's electric power if the turntable 32 is removed to expose the cutting device 20, as shown.

Referring back to FIG. 1a, the disk blade 34 of a power-driven cutting device 20 is positioned slightly lower than, and adjacent to, riser blocks 26. The cutting device 20 has a horizontal disk blade 34 extending above table 16 by a distance substantially corresponding to the slice thickness required, typically between 3 and 5 mm. In the embodiment shown, cutting device 20 drives the rotary disk blade 34, having a diameter exceeding that of the bakery product, bagel 12. Disk blade 34 may be serrated, if advantageous for the type of food item being cut.

A power-driven turntable 32, spaced above the disk blade 34, is connected to and revolves about a vertical axis 36. Turntable 32 is driven by a small motor 38 having a friction pulley 40 affixed to the output axis of the motor. The turntable 32 rigidly supports an open-ended feed hopper 44 adapted to contain a stack of bakery product items, such as bagels 12. The lowest bagel 12a rests on table surface 16, while being intermittently pushed by the hopper 44 into contact with disk blade 34, producing a slice 22 upon each revolution of turntable 32. As the turntable 32 revolves, the lower face of hopper 44 passes between the pair of spaced-apart, wedge-like riser blocks 26 and also passes closely above disk blade 34.

Figure 1C:
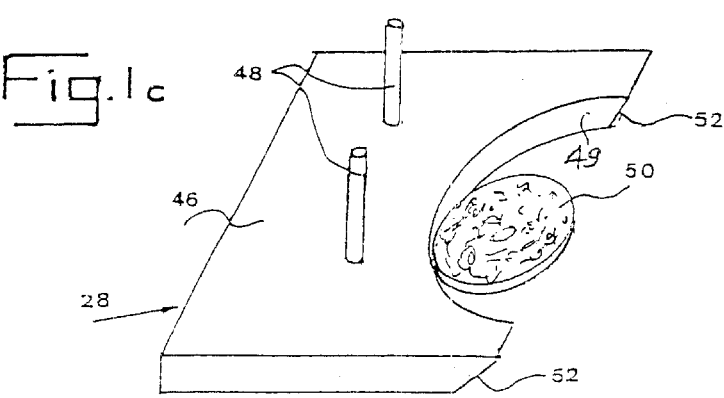

A follower-pusher 28, shown in greater detail in FIG. 1c, comprises a segment plate 46 and a pair of guide rods 48, and has a leading curved surface 49, which contacts any part of the bagel 50 lower than the bottom edge of the hopper 44. The follower-pusher 28 is driven by the turntable 32 and is located thereunder adjacent to the hopper 44 at its trailing edge. The follower-pusher 28 is carried by and revolves under the turntable 32, being restricted for moving horizontally relative to the turntable 32 by guide rods 48, allowing vertical movement only. The follower-pusher 28 is floatingly disposed. The segment plate 46 is urged downward either by gravity, as shown in the present embodiment, or by compression springs (not shown) or by direct attachment of the follower pusher 28 to a leaf spring (not shown) attached under the turntable 32 to be biased into sliding contact with the table surface 16.

An alternative configuration (not shown) for the follower-pusher 28 is to merely connect the two guide rods 48 with a curved strip to form the curved surface 49, thus eliminating the segment plate 46.

In operation the segment plate 46 pushes into the disk blade 34 any remnant 50 escaping from the feed hopper 44 which has not passed through the disk blade 34. Thereafter the segment plate 46, advantageously provided with an inclined plane 52 on its forward edges, comes into engagement with the riser blocks 26 to ride over the disk blade 34. The riser blocks 26 are essential to prevent the segment plate 46 being pushed into contact with the disk blade 34. After pushing the bagel remnant 50 into the disk blade 34, and passing over the top of the disk blade, the segment plate is automatically lowered to remake contact with the table surface 16, the cycle repeating with each revolution of the turntable 32. The segment plate 46 is suitably made of a wear-resistant polymer such as acetal.

It will be seen from FIG. 1a that there is no need for the segment plate 46 to be as thin as the slice 22 being produced. On the contrary, the thick segment plate 46 shown, provides assurance that the remnant 50 being pushed into the disk blade 34 will not override the follower-pusher 28.

Figure 2:
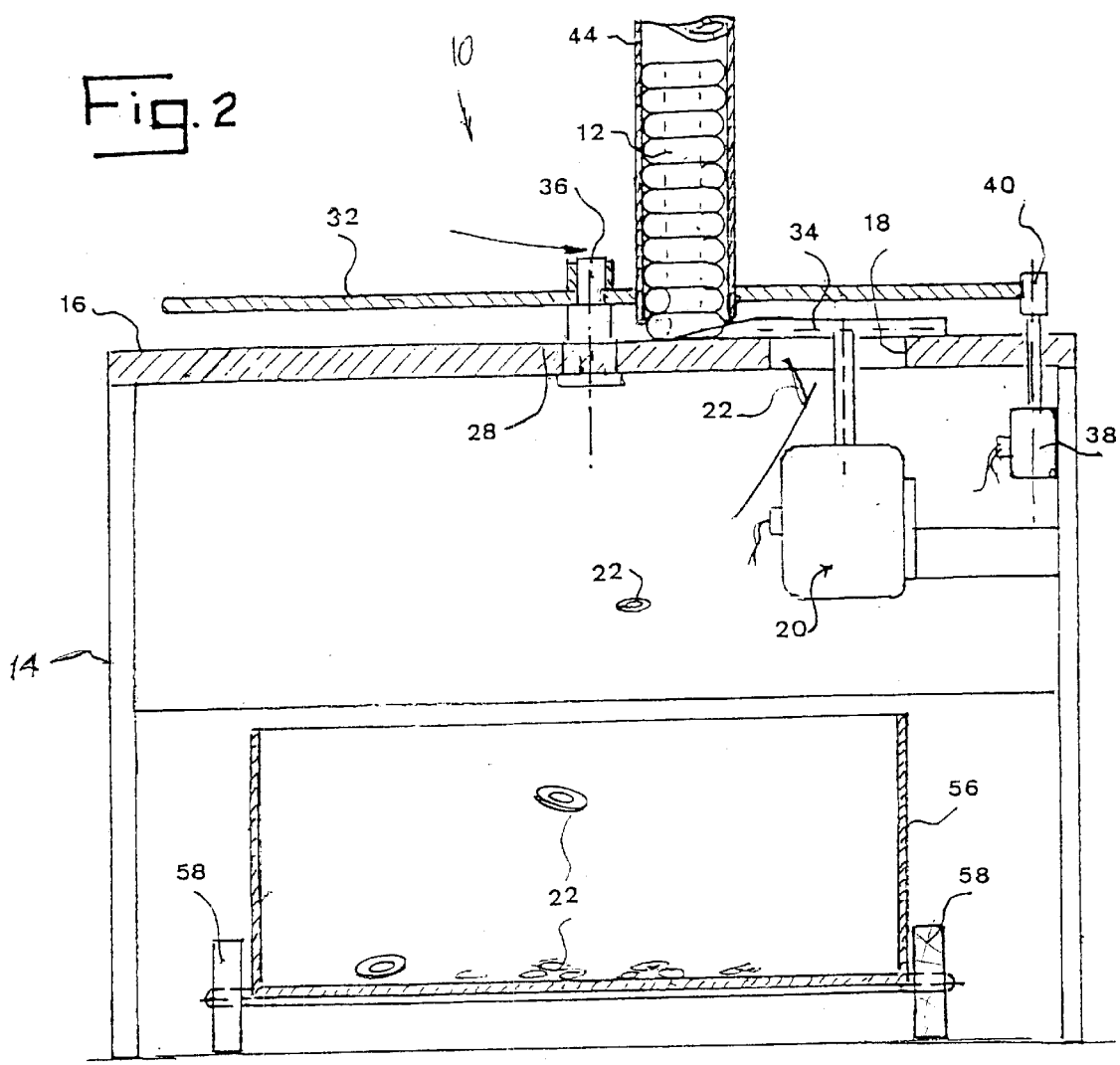

Referring now to FIG. 2, there is seen a slicing machine 10 further provided with a removable collector bin 56 positionable in the machine housing 14 under the aperture 18. Utilizing the adequate space available under the mechanism, the bin 56 is sized to accept enough cut slices 22 to obviate the need for emptying while the machine 10 is running. In the shown preferred embodiment the bin 56 is equipped with wheels 58.

Figure 3:
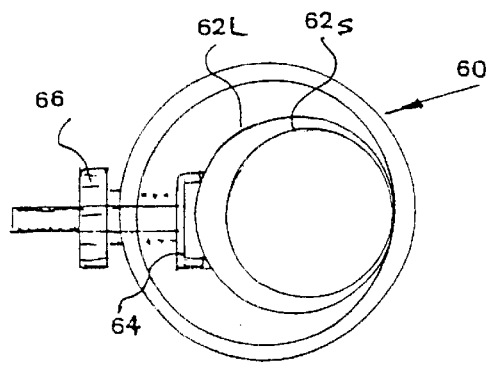

FIG. 3 illustrates a detail of a slicing machine 10 wherein the feed hopper 60 is adjustable to contain a stack of bakery product items, such as a bagel 62 of varying size. The outer dimensions of the feed hopper 60 are made large enough to accept the largest bagel 62L to be handled, while an internal plate 64, which extends along the full height of the hopper 60, is adjustable to guide a stack of the smallest bagels 62S needing slicing. External adjusting means 66 for the internal plate 64 are provided.

Figure 4:
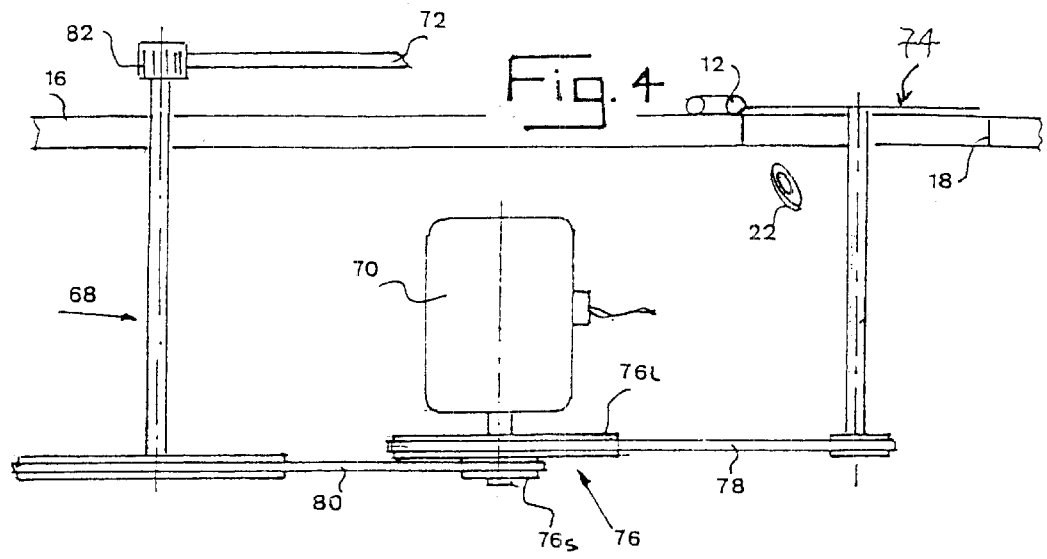

Seen in FIG. 4 is a drive mechanism 68 of a slicing machine, wherein a single electric motor 70 is arranged to drive the turntable 72 and the cutting device 74. The motor 70 carries a stepped pulley 76. The larger section 76L of the pulley 76 provides a speed-increase belt drive 78 to the cutting device 74, typically running at about 2000–3000 r.p.m. The smaller section 76S provides a speed reducing belt drive 80 for a pulley 82 which contacts the periphery of the turntable 72, which is driven at about 25–50 r.p.m.

Figure 5:
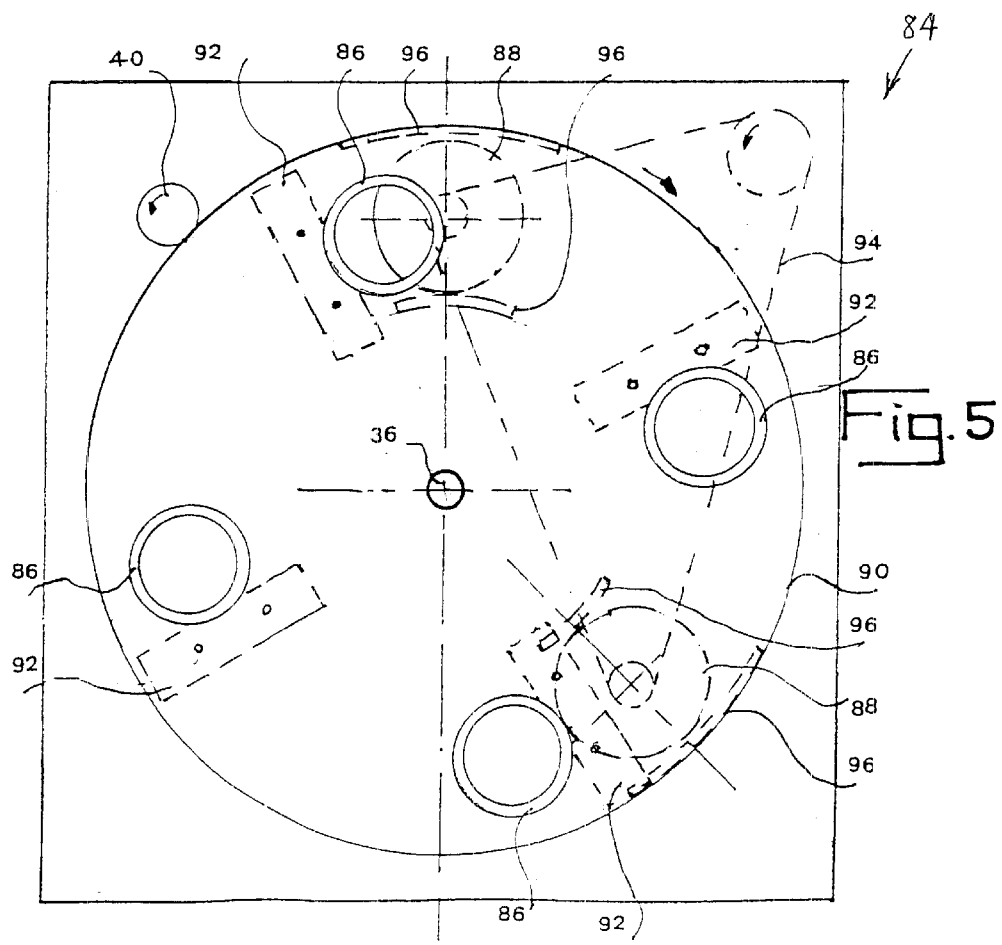

A prototype of the machine described herein has been built and tested. During the tests, the turntable was driven at 25 r.p.m. past a single cutting station, thus producing 25 slices per minute. By adding a further three hoppers, output reaches 100 slices per minute. A more sturdily constructed machine could undoubtedly be driven somewhat faster, and obviously its output could be doubled by installing a second cutting station spaced apart from the first, as seen in FIG. 5. On this basis, a maximum output of 200 slices per minute is a reasonable expectation.

For purposes of simplicity the prototype machine was equipped with a disk cutting device having a smooth blade. It is also possible to use a band-saw type blade for the cutting device. Although no serrated disk blade was available for testing, it is a likely assumption that a moderately serrated blade would reduce the required cutting forces and would further facilitate the achievement of a high output rate.

Referring now to FIG. 5, there is depicted in outline a slicing machine 84 provided with four feed hoppers 86 and two cutting devices 88. The four feed hoppers 86 are spaced 90° from each other around turntable 90, each hopper 86 being provided with its own follower-pusher 92. The two cutting devices 88 could be spaced 180° from each other; however, spacing them at 135°, as shown, is preferred for smoothing out power demand and for the convenience of driving both cutting devices 88 with a single belt drive 94. Each cutting device 88 is provided with its own pair of spaced-apart wedge-like riser blocks 96. Slicing machine 84 will produce up to 300 slices per minute.

One of the advantages of the present invention is that there is no difficulty in changing the thickness of the slices produced. This is done by either raising or lowering the cutting device blade relative to the table, or by arranging a section of the table adjacent to the cutting device to be raised or lowered.

Requirements of safety and ease of servicing, which are often in conflict, have been given due consideration. To provide quick access to the cutting blade for maintenance and cleaning, the turntable is configured to be lifted off its bearings without requiring any tools. A proximity switch under the turntable immediately cuts off the power when the turntable is lifted, thus preventing operator contact with an active cutting device.

Although the machine of the present invention has been developed for slicing bagels, the machine can also slice other food products of a similar size, and the references to bagels in the present text are not intended to limit the use of the machine for this purpose.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A machine for slicing a bakery product, comprising:

a supported table surface having an aperture for the passage therethrough of sliced products;

a pair of spaced-apart riser blocks projecting above said table surface;

at least one power-driven cutting device disposed adjacent and between to said riser blocks, the cutting device having a horizontal blade extending above said table surface at a distance substantially corresponding to the slice thickness required, and a power-driven turntable, revolvable on a vertical axis and spaced above said cutting device, the turntable rigidly supporting at least one open-ended feed hopper adapted to contain a stack of bakery product items, the lowest item in said stack resting on the table surface and being pushed by the hopper into contact with said cutting device to produce a slice.

2. The machine for slicing a bakery product according to claim 1, further comprising:

a follower-pusher supported by said turntable and located under the turntable adjacent to the trailing edge of said hopper, the follower-pusher being restricted from moving horizontally relative to said turntable but being freely suspended vertically and being urged downward to come into sliding contact with the table surface, said follower-pusher being arranged to push any remnant escaping from the feed hopper into the cutting device and to come into engagement with said riser blocks, whereby said remnant enters the cutting device and contacts said table surface again after it passes through said cutting device.

3. A slicing machine according to claim 1, further comprising:

a removable collector bin positioned within said housing under said aperture.

4. A slicing machine according to claim 1, wherein said cutting device comprises a rotary disk blade.

5. A slicing machine according to claim 1, wherein said open-ended feed hopper is adjustable to contain a stack of bakery product items of varying sizes.

6. A slicing machine according to claim 1, wherein a single electric motor is arranged to drive both said turntable and said cutting device.

7. A slicing machine according to claim 1, comprising four angularly spaced-apart feed hoppers and two cutting devices.

8. A slicing machine according to claim 1, wherein said bakery product is a bagel.

* * * * *